United States Patent [19]

Bessler

[11] Patent Number: 4,667,480

[45] Date of Patent: May 26, 1987

[54] METHOD AND APPARATUS FOR CONTROLLING AN ELECTRICALLY DRIVEN AUTOMOTIVE AIR CONDITIONER

[75] Inventor: Warren F. Bessler, Schenectady, N.Y.

[73] Assignee: General Electric Company, Schenectady, N.Y.

[21] Appl. No.: 910,119

[22] Filed: Sep. 22, 1986

[51] Int. Cl.[4] .................. F25D 17/00; H02H 7/00; F25B 49/00

[52] U.S. Cl. ........................ 62/180; 62/244; 62/228.4; 62/323.3; 318/332; 361/22; 417/32; 417/44

[58] Field of Search .............. 62/180, 186, 239, 243, 62/244, 126, 127, 129, 228.1, 228.4, 323.4, 323.3, 133, 134; 165/41, 42, 43; 318/332, 334; 417/13, 14, 32, 42, 44; 361/22, 23, 24, 25, 30

[56] References Cited

U.S. PATENT DOCUMENTS

| | | | |
|---|---|---|---|
| 4,328,678 | 5/1982 | Kono et al. | 62/126 |
| 4,459,519 | 7/1984 | Erdman | 318/254 |
| 4,478,274 | 10/1984 | Naganoma et al. | 62/244 X |
| 4,498,309 | 2/1985 | Kobayashi et al. | 62/186 |
| 4,604,036 | 8/1986 | Suton et al. | 417/32 X |

OTHER PUBLICATIONS

Y. Nishimura et al., "Development of Two-Stage Variable Displacement Compressor for Automotive Air Conditioner", International Congress & Exposition, Detroit, Mich., Feb. 25-Mar. 1, 1985.
H. Bengsch, "Computer Simulation of Automatic Climate Control Functions in Cars", International Congress and Exposition, Detroit, Mich., Feb. 24-28, 1986.
T. Okada et al., "Development of Energy Saving Automatic Airconditioner", International Congress and Exposition, Detroit, Mich., Feb. 24-28, 1986.
K. Kushida, "Development of Power Saving Automotive Air Conditioning System", Mitsubishi Heavy Industries, Ltd., Technical Review, Jun. 1984, pp. 138-145.

Primary Examiner—Harry B. Tanner
Attorney, Agent, or Firm—William H. Steinberg; James C. Davis, Jr.; Paul R. Webb, II

[57] ABSTRACT

A control system for an electrically driven variable capacity automotive air conditioning system affords the passenger maximum comfort control without overloading an electrically commutated motor compressor drive. Driver selected comfort settings are sequentially overridden to avoid overloading the motor. As motor overload conditions are alleviated the control system gradually returns to the initial driver selected comfort settings.

9 Claims, 6 Drawing Figures

METHOD AND APPARATUS FOR CONTROLLING AN ELECTRICALLY DRIVEN AUTOMOTIVE AIR CONDITIONER

BACKGROUND OF THE INVENTION

This invention relates to controls for automotive air conditioners driven by electric motors. In recent years, the percentage of American automobiles having air conditioning systems installed has increased to approximately 85%. Concurrently, efforts to improve fuel economy has resulted in smaller engines. In current automotive air conditioning systems, the compressor is belt driven from the engine crank shaft and is therefore constrained to follow engine speed. The load from a cycling fixed displacement compressor can significantly affect vehicle driveability and performance.

Current air conditioning systems are operated from the engine via belt drive, and control cooling capacity by either electrically cycling the compressor drive clutch on or off, or by throttling the compressor suction mechanically with a pressure activated control valve. Either way, evaporator pressure is maintained in a range which produces adequate cooling temperatures without being so cold that ice forms on the evaporator coil.

Another way to control cooling capacity is to mechanically vary compressor displacement over a continuous range to maintain constant evaporator pressure. Other variations of this recently commercialized approach include compressors that can operate on either all or half of their cylinders for 100%/50% capacity control. In all cases the evaporator pressure/temperature is maintained nearly constant and the temperature of air entering the vehicle is controlled by mixing heated air from the heater core with the cold air leaving the evaporator. The air entering the evaporator can either be outside air or recirculated cabin air, or a combination of the two depending on the particular vehicle design. A "maximum A/C" control is usually provided which limits outside air intake to approximately 15% of full flow.

In vehicles equipped with automatic temperature control (ATC) the temperature of air entering the vehicle is controlled by mixing heated air from the heater core with cold air leaving the evaporator. Control of the mixing door is accomplished by sensing cabin temperature and comparing it to the desired control setting. On fully automatic systems the fan speed is also controlled in proportion to the difference between actual and desired cabin temperature settings. More sophisticated ATC systems recently developed by the Japanese use a computer to predict vehicle cooling load based on measurement ambient and interior temperatures and solor insolation. The required cold air delivery temperature necessary to meet the load is calculated and the compressor is cycled at the proper frequency to maintain this temperature. The system saves energy by eliminating reheat at the expense of increased compressor cycling.

The conventional systems described above have several drawbacks. Use of the heater core to reheat conditioned air is inefficient. Cycling compressors result in wide fluctuation of air delivery temperatures. Compressors that mechanically modulate capacity do not control air delivery temperature, but instead maintain a constant evaporator temperature. This allows the blower fan speed and outside air intake to adversely affect delivery air temperature and hence lower comfort levels.

U.S. Pat. No. 4,459,519 shows a refrigeration system for use in the passenger compartment of a vehicle. The system comprises a brushless D.C. motor hermetically sealed with a compressor. Compressor speed is varied by sensing evaporator temperature and comparing it with a reference temperature. An alternator output is controlled in accordance with the difference between the evaporator temperature and the reference temperature, thereby varying the speed of the brushless D.C. motor. The temperature of the compartment being cooled is sensed and compared with a desired compartment temperature, and the operating speed of the evaporator fan is varied in accordance with the difference between the sensed temperature and the desired temperature. The reference temperature for the evaporator is automatically varied in accordance with a signal indicative of the evaporator fan speed, thereby changing the temperature of the air moved by the fan, facilitating control of the compartment temperature at the desired temperature.

It is an object of the present invention to provide a control for an electrically driven automotive air conditioner that can provide full cooling capacity at any engine speed.

It is a further object of the present invention to provide a control for an electrically driven automotive air conditioner that can provide control of air conditioned air temperature without using reheating or compressor cycling.

It is a still further object of the present invention to provide a control for an electrically driven automotive air conditioner that protects the electric motor driving the compressor from overload conditions while maintaining driver comfort.

SUMMARY OF THE INVENTION

In one aspect of the present invention a method of controlling an electrically driven automotive air conditioning system is provided, comprising the steps of monitoring driver commanded air delivery temperature proportion of outside to recirculated air introduced to the air conditioning system, and air conditioner blower fan speed. The actual air delivery temperature, motor power and motor temperature are measured. The motor speed of the motor driving the air conditioner compressor is varied to minimize the difference between the commanded and measured air delivery temperature. A damper is positioned to achieve the commanded proportion of outside to recirculated air and a blower fan is set to the commanded speed. When the motor power or temperature exceed predetermined limits, the damper position command is overridden reducing the proportion of outside air to reduce motor load. The motor speed is also reduced when the motor power or temperature exceed a predetermined limit to reduce motor load. The commanded blower fan speed is overridden next to reduce fan speed when allowable motor temperature or power are exceeded. The damper position and fan speed are restored and the motor speed is allowed to vary to achieve the commanded air temperature, when motor power and motor temperature no longer exceed allowable values.

BRIEF DESCRIPTION OF THE DRAWING

While the specification concludes with claims particularly pointing out and distinctly claiming the present invention, objects and advantages of the invention can be more readily ascertained from the following description of preferred embodiments when used in conjunction with the accompanying drawing in which

DETAILED DESCRIPTION OF THE DRAWING

Figure 1:
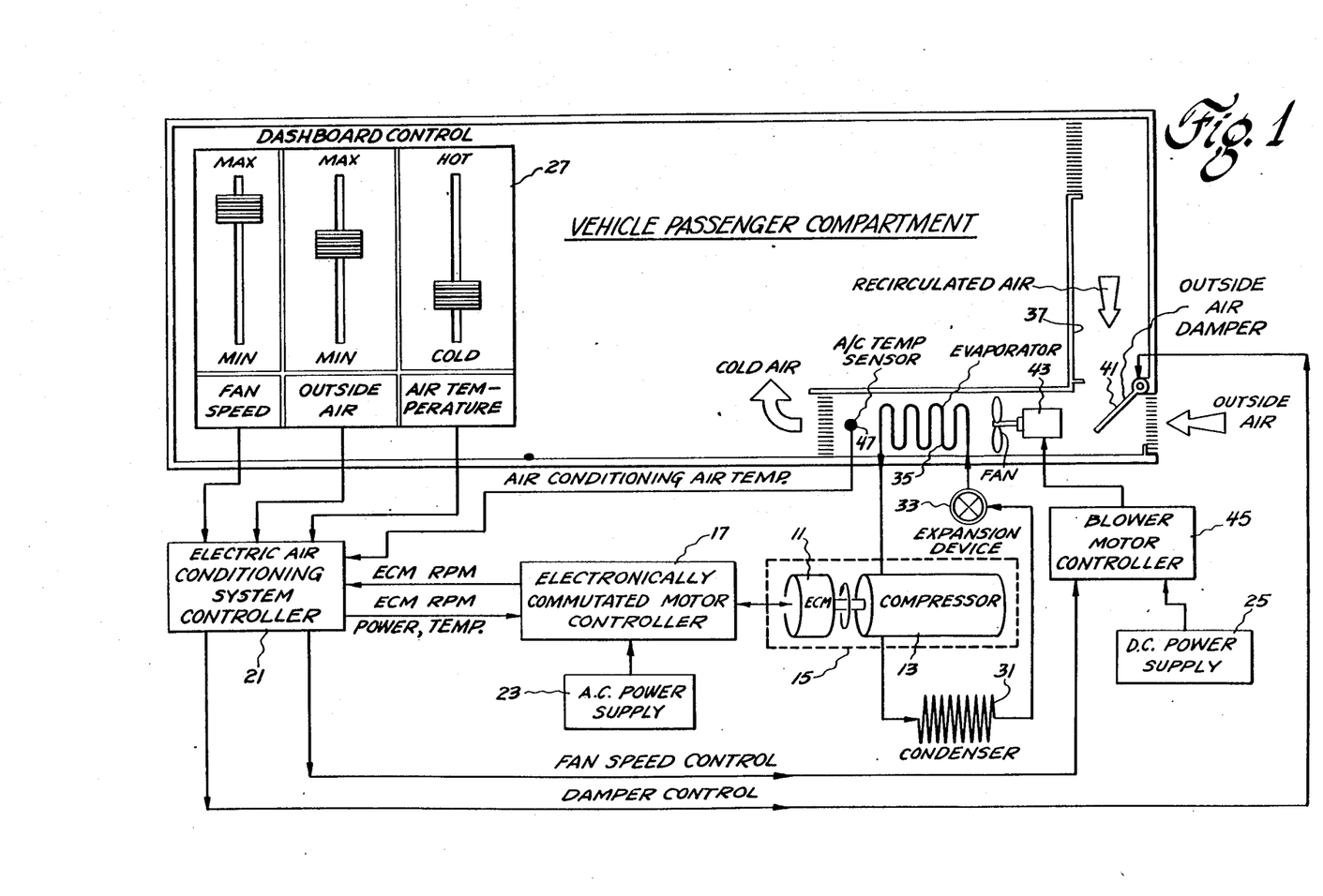
FIG. 1 is a part block diagram, part schematic representation of a control system for an electrically driven automotive air conditioner in accordance with the present invention.

Referring now to the drawing wherein like numerals indicate like elements throughout and particularly to FIG. 1 thereof, a control system for an electrically driven air conditioner is shown. A variable speed motor 11 drives driving an air conditioner compressor 13. The motor and compressor are preferably hermetically sealed into a single unit 15, which eliminates shaft seal refrigerant leakage problems prevalent in automotive air conditioners. The motor is preferably an electronically commutated motor or brushless DC motor, such as a three phase surface magnet motor. The brushless DC motor, substitutes electronic circuits for the brushes and commutator bars of the traditional DC motor. The brushless motor can be configured with radial or axial air gap and with the rotor either inside or outside the stator. The motor can be designed with sine or square wave windings. The number of motor poles selected influences the degree of demagnetizing protection. Whatever the design, best results are achieved by mounting the permanent magnets as arcs on the surface of the rotor. A number of permanent magnet compositions are applicable with two standing out as most economically viable, namely ferrite and a cold pressed-/epoxy bonded NdFeB. Both have recoil permeabilities of near unity, an important feature in motor design, but the NdFeB composition has substantially better flux and demagnetizing properties. The NdFeB would be used where there is a need for small size or improved demagnetizing margins.

The motor speed is controlled by an electronically commutated motor (ECM) controller 17 which comprises a three phase rectifier and a DC to AC inverter with control circuitry for operating in the pulse width modulation mode. Alternatively, the motor can be controlled by field control, of an alternator used as the power source (not shown). The controller 17 in response to a speed control signal from electric air conditioning system controller 21, provides variable magnitude and frequency stator currents to the motor 11.

Power to the ECM controller is provided by an AC power supply 23 which can comprise the output of an alternator prior to rectification. The choice of an appropriate voltage for the AC power supply is dependent on the air conditioning load, component efficiencies, current ratings of switching devices in the inverter and industry standardization. Electric air conditioning system controller 21 is a microprocessor based controller powered by a DC power supply 25. Controller 21 is shown in more detail in FIG. 2. Referring again to FIG. 1, controller 21 receives input signals from a dashboard mounted controller 27 which has separate adjustments for desired air temperature, proportion of outside air flow introduced and blower fan speed. The controller 27 can be a microprocessor controlled display with push button entry or as is shown in the present embodiment, a variable resistance slide control. The air temperature, proportion of outside air flow introduced and blower fan speed are each continuously variable from the minimum to the maximum setting.

The compressor 13 compresses gaseous refrigerant to raise the temperature and pressure of the refrigerant. The refrigerant flows from the compressor to a condensor 31 where the refrigerant gives up heat and condenses to a liquid. The high pressure liquid refrigerant expands as it passes through the expansion valve 33 and flows to an evaporator 35 located in duct work 37 in flow communication with the interior of a vehicle. The cool liquid refrigerant in the evaporator 35 removes heat from the air passing through the evaporator, with the heated refrigerant from the evaporator flowing as a gas back to the compressor 13 to repeat the cycle. A damper 41 located in the ductwork controls the mix of outside air (fresh air) and recirculated air blown over the evaporator by a blower fan. The blower fan 43 is preferably an electrically commutated motor such as a surface magnet motor driven by a DC/AC inverter which is part of a blower motor controller 45. A temperature sensor, such as a thermocouple 47, is located in the outlet of the ductwork, where the temperature of the cold air provided by the air conditioning is measured. The thermocouple 47 is coupled to the electric air conditioning system controller 21. The controller 21 also receives feedback information of the power supplied to the motor 11 from the ECM controller 17 and motor temperature from a thermocouple mounted in the motor (not shown).

Figure 2:
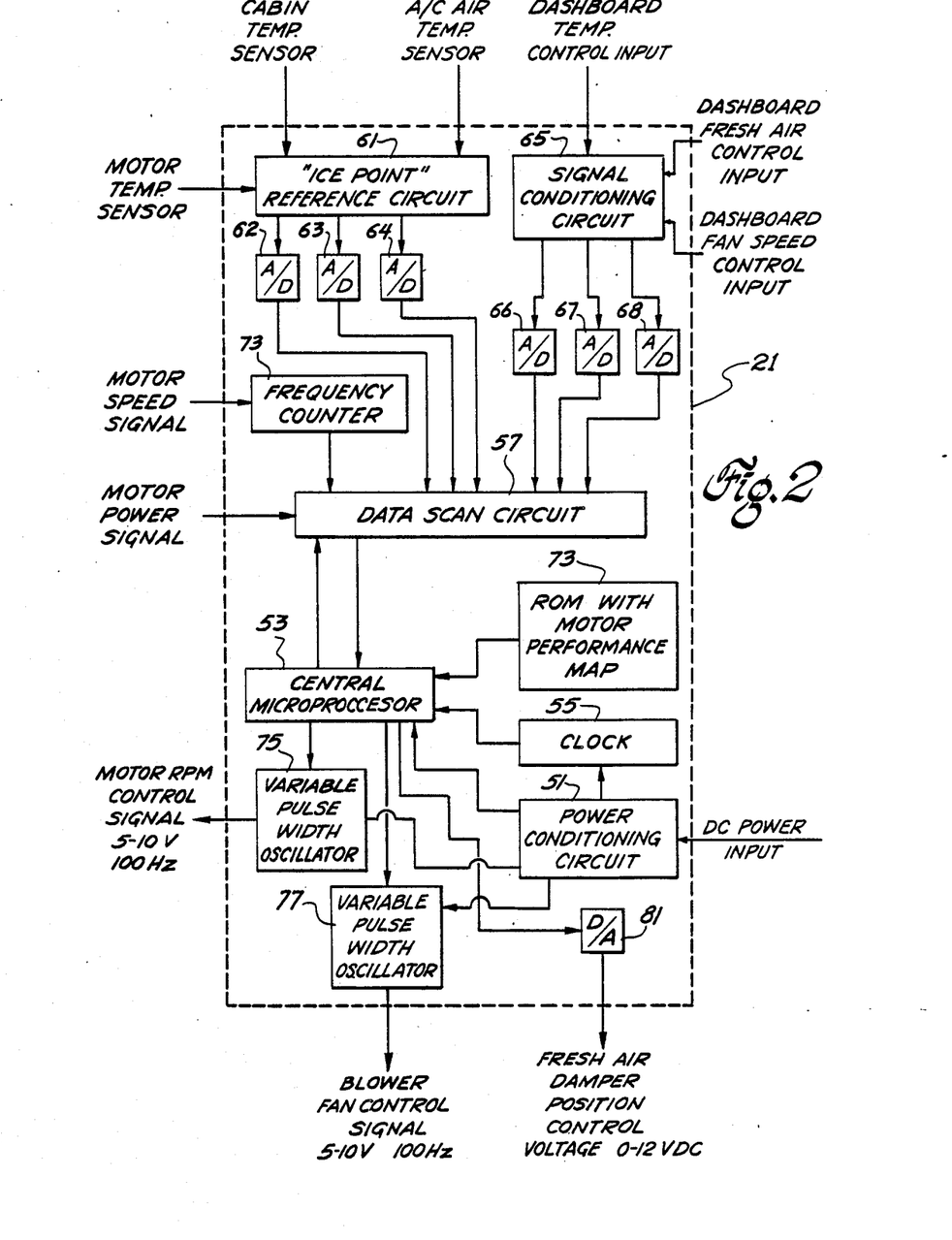
FIG. 2 is a block diagram representation of the electric air conditioning controller of FIG. 1.

Referring now to FIG. 2, the electric air conditioning system controller 21 receives DC power input at a power conditioning circuit 51 which provides power at the appropriate voltages to a central microprocessor 53 and other electric air conditioning system controller circuits. The microprocessor 53 which is driven by a clock 55 receives digitally encoded signals from a data scan circuit 57 which operates as a multiplexer. The motor temperature sensor, A/C air temperature sensor and cabin temperature are coupled to "ice point" reference circuitry 61. The cabin temperature input is not used in the embodiment of FIG. 1. Thermocouples operate by relying on the small voltage generated between dissimilar metals that varies as a function of temperature. A reference junction is needed for each thermocouple and the temperature measured by a thermocouple depends on the reference and sensing junction temperatures. The "ice point" reference circuit 61 provides a compensating and amplifying circuit that corrects for the difference caused by having the reference junction at a temperature other than 0° C. The corrected and amplified analog voltage signals from the thermocouples, indicative of the measured temperatures, are converted to digital signals by A/D converters 62, 63, and 64. The three dashboard control inputs are coupled to a signal conditioning circuit 65 and then to A/D converters 66, 67, and 68. A/D converters 62, 63, 64, 66, 67 and 68 are coupled to the data scan circuit 57. The motor speed command signal is coupled to a frequency counter 73 which provides a digital output to the data scan circuit 57. The digitally encoded motor power signal from the ECM controller 17 of FIG. 1 is coupled to the data scan circuit 57 as well.

Figure 3:
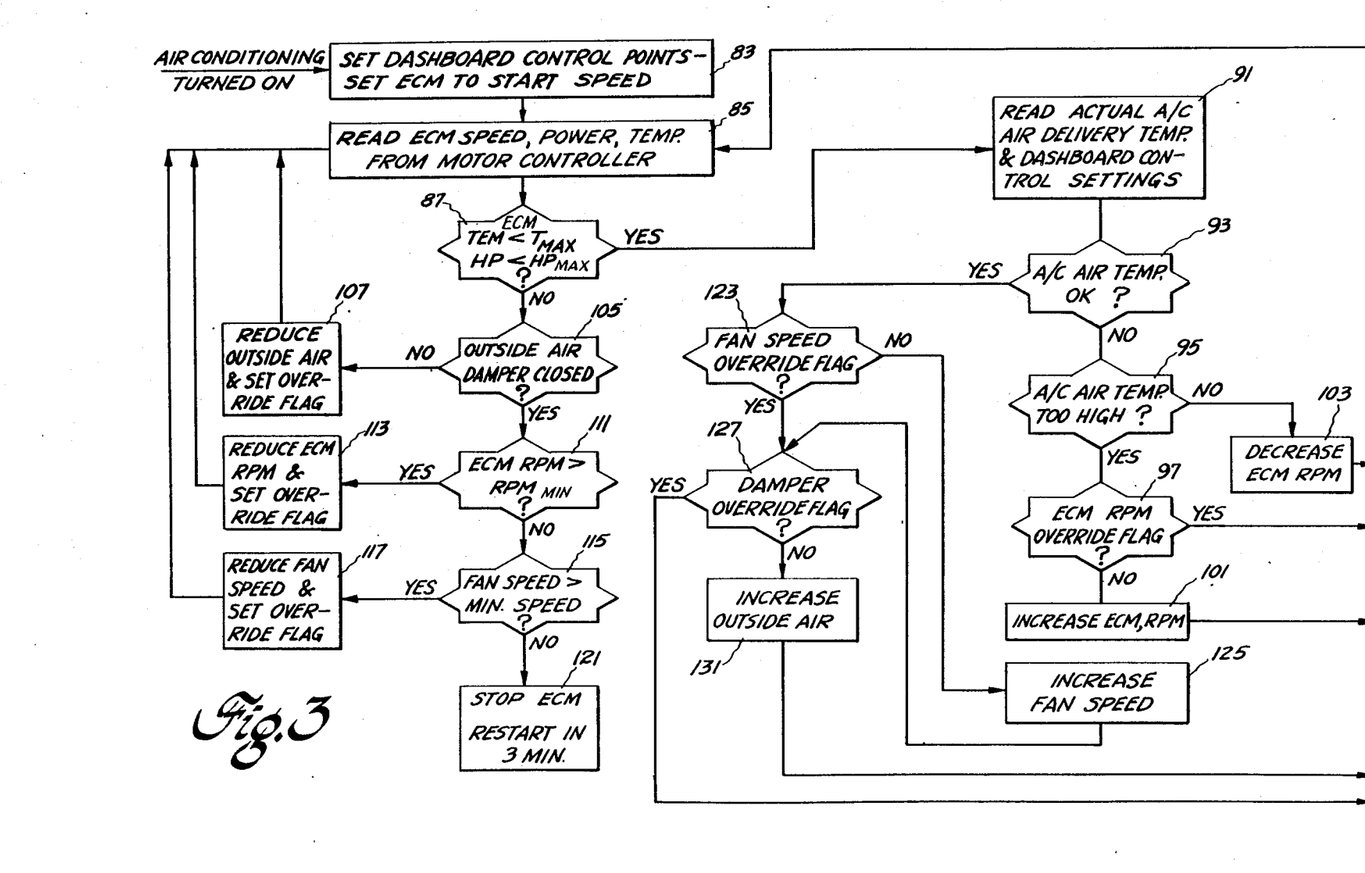
FIG. 3 is the flow chart showing the control logic used in controlling the electrically driven air conditioner.
Figure 4:
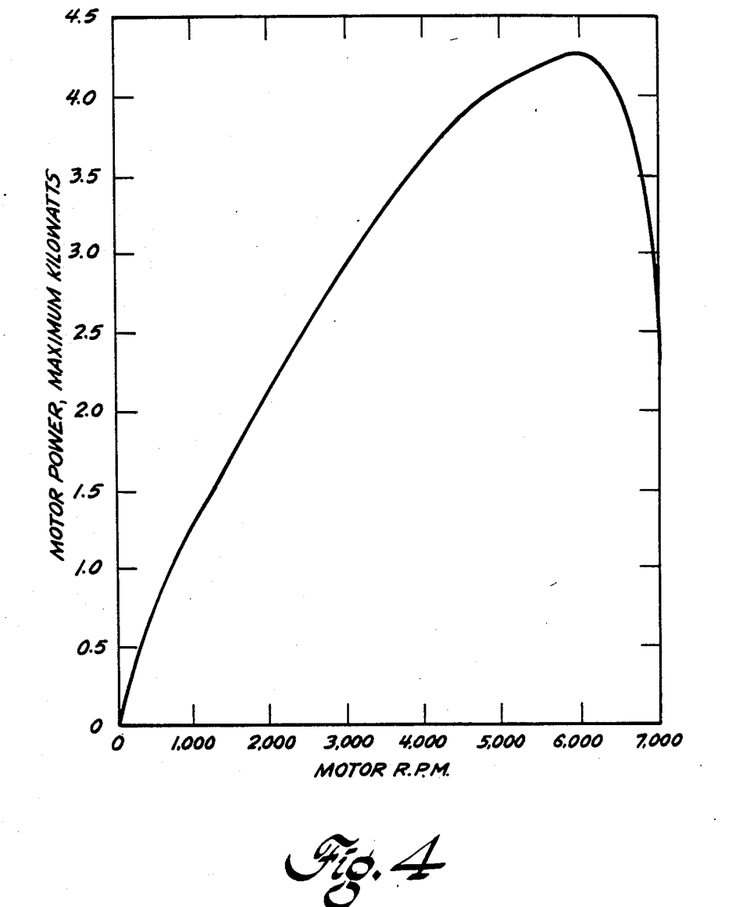
FIG. 4 is a graph showing the maximum electrically commutated motor power curve as a function of motor rpm, used in controlling the electrically driven air conditioner.

The central microprocessor 53 performs the logic shown in FIG. 3. Referring again to FIG. 2, read only memory (ROM) 73 is coupled to the central microprocessor 53, ROM 73 contains maximum permissible motor power as a function of motor speed or alternatively maximum permissible motor current in terms of motor speed. A typical graph of maximum power versus speed is shown in FIG. 4. The central microprocessor provides motor rpm control signals and a blower fan rpm control signal to variable pulse width fixed frequency oscillators 75 and 77, respectively, which in turn are coupled to the ECM controller 17 and blower fan controller 45, respectively, of FIG. 1. The fixed frequency variable pulse width signals permit opto-isolation between the motor and the electric air conditioning system controller. The opto-isolation signal is averaged and motor speed is approximately linear with respect to the averaged signal. The central microprocessor provides a digitally encoded signal to D/A converter 81, which in turn provides a fresh air damper position control analog signal to the damper 41 of FIG. 1.

In operation the ECM motor speed is determined by comparing the actual air delivery temperature with the desired air delivery temperature. The motor speed and hence the system cooling capacity is then either increased or decreased proportionally, to minimize the difference in measured and commanded values. The motor temperature and power are measured and compared to maximum safe allowable values at the present operating speed. If the motor exceeds the safe allowable values, the outside air damper is progressively closed to limit evaporator load. Reducing the amount of outside air introduced reduces the required motor power and reduces the air delivery temperature. The reduction in the air delivery temperature results in a lowering of the motor speed, further reducing heat exchanger (evaporator and condensor) and motor loads. Thus the control system override of the selected fresh air setting can first be used to prevent ECM motor overload with little or no sacrifice in comfort levels.

If during motor overload conditions the outside air damper reaches its minimum opening and the motor continues to be overloaded, then motor speed is gradually reduced to unload the heat exchangers. This overrides the driver selection of desired air delivery temperature temporarily, until motor loads become acceptable. If upon reaching the minimum motor speed the motor continues to be overloaded, fan speed is gradually reduced. If this does not alleviate the overload, the motor is stopped and restarted after a time delay which in the present embodiment is three minutes. As motor overload conditions are alleviated, the control system gradually returns to the initial driver selected comfort settings. By controlling the override of the driver selected parameters, acceptable comfort is maintained without damage to the ECM.

The control strategy is carried out, as shown in the flow chart of FIG. 3, by the electric air conditioning system controller 21. The air conditioner is turned on by the vehicle operator. The dashboard controls 27 are operator set and the electrically commutated motor 11 is set to a predetermined start speed, which in a preferred embodiment is full speed, in block 83 of the flow chart. The program then enters a loop in which the first step is to read the ECM speed, power and temperature from the motor controller in block 85 and the second step is to compare the ECM temperature to a maximum permissible ECM temperature $T_{max}$ and to compare ECM power to a maximum permissible power $HP_{max}$ in a look-up table stored in ROM in decision block 87. The table contains the information shown in the graph of FIG. 4, with motor rpm used to determine permissible power at that operating point. The decision block 87 determines whether the ECM speed is to be set to control air delivery temperature and whether outside air flow and blower fan speed are to be set to their commanded values or whether ECM speed, damper setting and fan speed are to be overridden to remove an overload condition. If the ECM maximum power and temperature are not being exceeded, the actual air delivery temperature and dashboard control settings are read in block 91. The air temperature is next checked in decision block 93 and if it is too high as determined in block 95, a check is made in decision block 97 to see if a command for the ECM speed is being overridden because of excessive ECM temperature or power. If the ECM speed is not being overridden, the ECM speed is increased in block 101, which increases the cooling capacity of the air conditioning system. The ECM speed is further adjusted in block 101 and 103 in subsequent passes through the loop to reduce the difference between commanded and actual air delivery temperature.

If the ECM temperature and power ratings are read and either is found to be exceeding predetermined limits in block 87, the outside air damper is checked to see whether it is in its fully closed position in block 105. If the damper is not in its fully closed position, it is moved to reduce the amount of outside air introduced and an override flag is set for a predetermined length of time in block 107 and the control loop begins again. The damper is gradually closed as the program runs repeatedly through the loop, assuming the overload persists. However, when the damper reaches its fully closed position as determined in block 105 and there is still an overload condition, the ECM speed is then checked in block 111 to see whether the ECM speed is greater than its minimum speed, if it is the ECM speed is reduced to reduce motor load and a flag set in block 113. The control loop begins again. If the ECM speed reaches a minimum speed without alleviating the overload as determined in block 111, the fan speed is checked to see if it is at its minimum speed in block 115 and if it is not, it is reduced and a flag set in block 117. All flags are set for a predetermined length of time after which the flags are cancelled. If closing the damper door to its minimum open position, reducing ECM speed to a minimum and reducing fan speed to a minimum does not alleviate the overload, as determined in block 115, the ECM is stopped for a predetermined time such as, for example, three minutes in block 121. On restart the program begins at block 83 with all the override flags cancelled.

If the motor is not overloaded as determined in block 87, the actual A/C air delivery temperature and dashboard control settings are read in block 91. If the air temperature is in a narrow band around the desired temperature as determined in block 93 and the fan speed override flag has not been set or has timed out as determined in block 123, the fan speed is increased if it is below the dashboard control setting in block 125. If the flag is set, the damper override flag is checked in block 127 and if it is not set, the damper door is adjusted in block 131 to allow more outside air. If the dashboard setting is greater than the present amount, the loop begins again. If the damper override flag is set, no changes are made and the loop begins again. After adjusting the outside air damper if the fan override flag is determined to be set the loop is again repeated.

Figure 5:
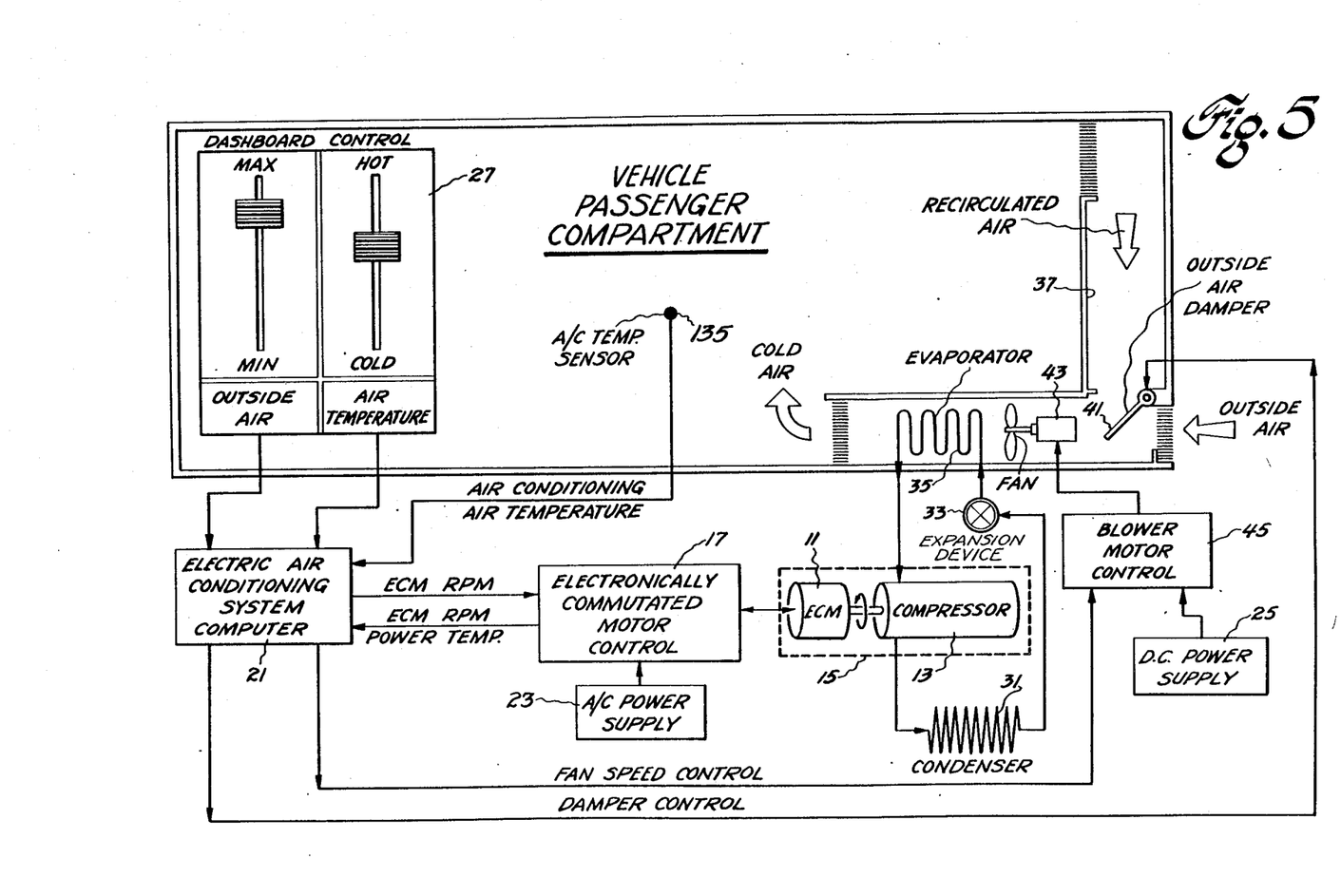
FIG. 5 is a part block diagram part schematic representation of another embodiment of a control system for an electrically driven automotive air conditioner in accordance with the present invention.
Figure 6:
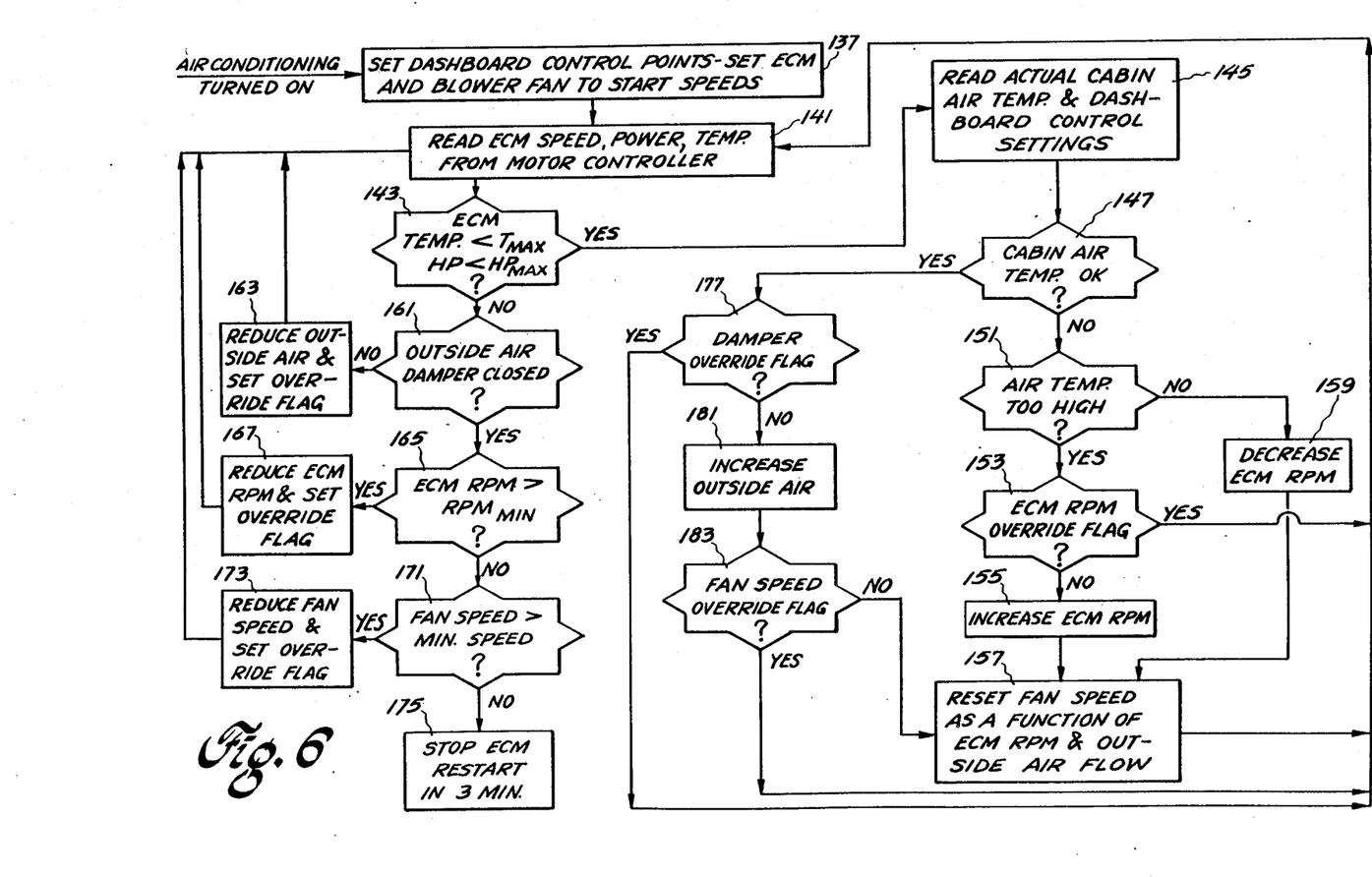
FIG. 6 is a flow chart for the control logic of the system shown in FIG. 5.

Referring now to FIG. 5 a part schematic part block diagram representation of an automatically operating air conditioning system is shown. The diagram is the same as the one shown in FIG. 1, except that there is no driver selected input fan speed in the dashboard control 27 and there is a cabin temperature sensor, such as a thermocouple 135. The hardware diagram for the electric air conditioning system controller is shown in FIG. 2 with the dashboard and speed control input to signal conditioning circuit 65 not being used. The other difference between FIG. 5 and FIG. 1 is the logic implemented by the central microprocessor 53 of the electric air conditioning system controller 21 of FIG. 5. The logic used in conjunction with the central microprocessor 53 of FIG. 5 is shown in FIG. 6.

In operation the automatically operated air conditioning system determines ECM speed based on a comparison of commanded and measured cabin temperature. The motor speed and hence system cooling capacity is then either increased or decreased proportionally to minimize the difference in observed and commanded values. Operating in a closed feedback loop, the ECM speed which achieves desired air temperature is established. Since this is an automatic system, blower fan speed is determined by the controller primarily as a function of the ECM speed. As ECM speed increases, the blower speed also increases to maintain a comfortable temperature of air exiting from the ductwork system. For the same reason, calculated fan speed is also a function of the outside air control setting. More fresh air causes a reduction in fan speed to compensate for higher inlet air velocity and temperature.

Motor power and temperature are monitored and compared to maximum allowable values, predetermined for each operating speed. If the ECM exceeds these power or temperature values, the outside air damper is progressively closed to limit evaporator load. The effects of damper closing is to reduce motor power and to lower air delivery temperature. This results in a lowering of motor speed further reducing heat exchanger and motor loads. Thus the control system override of the outside air delivery can be used initially to prevent ECM motor overload with little or no sacrifice in comfort levels.

Once the outside damper reaches its minimum opening and the motor continues to be overloaded, ECM speed is reduced to unload the heat exchangers and reduce motor losses. This allows the cabin air temperature to float temporarily until motor loads become acceptable. If the motor load continues to be excessive, then the computed fan speed setting is automatically overridden to slow fan speed and reduce the motor load. If the motor is still overloaded, the system stops and waits a preset period of time before attempting to restart. When the motor is running and overload conditions are alleviated, the parameters that were overridden return to their commanded values. By controlling the override of driver selected A/C settings, acceptable comfort is maintained without damage to the ECM.

The control strategy is carried out as shown in the flow chart of FIG. 6, by the electric air conditioning system controller. The air conditioner is turned on by the vehicle operator. The dashboard controls are set by the operator. The electrically commutated motor driving the compressor, is set to a predetermined start speed, which in a preferred embodiment is full speed and the blower fan is set to a predetermined speed in block 137. The program enters a loop in which the first step is to read the ECM power, speed and temperature from the motor controller in block 141 and the second step is to compare the ECM temperature to a maximum permissible ECM temperature $T_{max}$ and to compare ECM power to a maximum permissible power $HP_{max}$ in a look-up table stored in ROM in decision block 143. The table contains the information shown in the graph of FIG. 4, with motor rpm used to determine permissible power at each operating point. The decision block 143 determines whether the ECM speed is to be set to control cabin air temperature and whether outside air flow and calculated fan speed are to be used or whether ECM speed, damper setting and fan speed are to be overridden to remove an overload condition. If the ECM maximum power and temperature are not being exceeded, the actual cabin temperature and dashboard control settings are read in block 145. The cabin temperature is next checked in decision block 147 and if it is too high as determined in block 151, a check is made in decision block 153 to see if a command for the ECM is being overridden because of excessive ECM temperature or power. If the ECM speed is not being overridden, the ECM speed is increased in block 155, which, increases the cooling capacity of the air conditioning system. The fan speed is adjusted as a function of ECM speed and damper position in block 157. The ECM speed is further adjusted in blocks 155 and 159 in subsequent passes through the loop to reduce the difference between the commanded and actual cabin air temperature. The fan speed is adjusted when the ECM speed changes in block 157.

If the ECM temperature or power ratings are read in block 141 and found to be exceeding predetermined limits in block 143 the outside damper is checked to see if it is in its closed position in block 161 and if it is not, the outside damper is gradually closed and an override flag set in block 163 as the program runs repeatedly through the loop. However, when the damper reaches its fully closed position as determined in block 161 and there is still an overload condition, the ECM speed is then checked to see if it is greater than its minimum speed in block 165, if it is, ECM speed is reduced to reduce motor losses and a flag is set in block 167 and the loop begins again. If the ECM speed reaches a minimum speed, as determined in block 165, without alleviating the overload, fan speed is then checked in block 171 to see if it is above a minimum speed. If fan speed is above a predetermined minimum, the fan speed is gradually reduced and a flag set in block 173. All flags are set for a predetermined length of time after which the flags are cancelled.

If closing the damper door, reducing ECM speed to a minimum and reducing fan speed to a minimum does not alleviate the overload, the ECM is stopped for a predetermined time such as, for example, three minutes in block 175. On restart the program begins at block 137 with all the override flags cancelled.

If the ECM is not overloaded as determined in decision block 143, the cabin temperature and dashboard control settings are read in block 145. If the cabin temperature is in a narrow band around the desired temperature as determined in block 147 and the damper override flag has not been set or has timed out as determined in block 177, the damper door is opened to allow more outside air if the damper door is not already opened the amount selected at the dashboard control. The speed override flag is next checked in block 183 and if the flag is not set the fan speed is determined as a function of ECM rpm and outside air flow in block 157.

If the fan speed override flag is set as determined in block 183, the loop repeats without changing the fan speed. If the damper override flag is set, the damper is not adjusted and the loop repeated.

The amount of motor horsepower necessary to drive an electric automotive A/C system depends on the cooling capacity of the system, its efficiency, and the boundary conditions (i.e., temperatures) it is operating against. All of these quantities are variable under normal vehicle operation, but the following "standard" rating conditions are useful in assessing maximum power levels; stop and go driving in city traffic; hot soak followed by pulldown; and highway cruising with full outside air intake.

The idle/city traffic condition results in very high compressor discharge pressures which will tend to overload the brushless DC motor. To prevent this problem, fresh air must be restricted at idle to lower evaporator load and, if possible, the condensor fan temporarily oversped. In any case, this motor will operate at lower speeds during idle to prevent overload and consequently will not reach its maximum power requirement under these conditions. The idle condition does, however, require a motor design that offers good low speed torque characteristics to prevent stalling. System simulations suggest that the motor provides at least a 33% increase over full speed torque output when operating at 33% of its rated full speed to avoid stalling problems under idle tests. Typical system capacity at idle is 13,000–15,000 Btu/hr.

The hot soak/pulldown test is established by placing the vehicle in a hot sunny environment for 1-3 hours so that the cabin temperature rises into the 140°-160° F. range. The vehicle is then operated at 25-30 mph with max A/C and fan speed control settings. Typical pulldown capacity is 16,000-18,000 Btu/hr. Simulation of system performance under these conditions indicates that an electric A/C system operating at roughly ½ of its maximum speed would offer pulldown performance equivalent to a conventional A/C system. It could, however, operate at maximum speed (horsepower) during the pulldown test, thereby significantly shortening the time taken to reach acceptable cabin temperatures.

The third system rating condition, highway cruising, requires the A/C system to maintain comfortable cabin temperatures while processing up to 200-300 cfm of 100° F. 40% RH outside air. This establishes a maximum capacity level which in turn sets the size of the motor and its drive electronics. For conventional A/C systems, 24,000-30,000 Btu/hr of cooling (requiring a 5 H.P. motor) is not an unreasonable capacity requirement for this condition. Roughly 18,000 Btu/hr of the total load is used to condition the outside (fresh) air. Therefore, reducing or eliminating outside air load at highway speeds has a direct influence on the size of the electric drive system.

Since the highway test condition with full outside air currently sets the maximum motor horsepower, a series of computer simulations were conducted to explore ways of reducing horsepower at 50 mph. It was found that complete recirculation of cabin air under high ambient conditions can reduce motor loads below 2 horsepower. This is not acceptable from a comfort standpoint. It is more realistic in allowing at least 30% fresh air under all conditions. This results in a 2.8 H.P. motor using conventional compressor and cycle efficiencies. Using a two-stage cycle with 25% fresh air results in a 2.0 H.P. load on the motor. A conventional cycle using a high efficiency compressor coupled with a 20% fresh air limitation also results in a 2.0 H.P. load on the electric drive.

It therefore seems reasonable that 2 H.P. is a realistic minimum motor size for automotive air conditioning, using the 50 mph test condition. Simulating the idle and pulldown test conditions using 2 stage compressor control strategy allowing at least 25% fresh air and with a 2.0 H.P. motor show that it would be sufficient for these conditions as well.

Since motor/electronics cost strongly affects the feasibility of electric automotive A/C systems, and since this cost is a strong function of the required motor horsepower, development of efficient A/C systems is possible with the new fresh air control strategies of the type disclosed. A 2 H.P. A/C system with a capacity of 16,000 Btu/hr and an efficiency of 1.5 H.P./ton should provide performance equal to or better than todays systems. In this application brushless DC motor systems are expected to achieve efficiencies of 85-90% when designed specifically for hermetic automotive A/C applications. This translates into a maximum electrical demand from the vehicle power supply system of 1.7 kW when the A/C electrical drive operates under maximum cooling conditions. The environmental conditions that demand maximum cooling typically occur during only a small portion of the cooling season.

Power savings are afforded by the electric A/C system due to the reduced loading of the heat exchanger at reduce compressor flow rates compared with standard systems operating at constant full capacity. Another significant benefit is the elimination of compressor clutch cycling and the resulting improvement in vehicle driveability. The standard system with cycling compressor consumes 40% more power when the compressor is on compared to an electric A/C system operating continuously to deliver the same 1.6 tons of cooling. As the cooling load decreases, the difference in required engine horsepower between the two systems is even more significant since the electric system can reduce its capacity to match load. On the other hand, the standard system consumes more engine horsepower with increasing vehicle speed, unrelated to the vehicle's cooling load.

Studies indicate that the alternator would have to be at least 75% efficient to allow electric drive to match the efficiency of conventional belt drive systems. If a high efficiency compressor and refrigeration system were coupled to the motor, the alternator break-even efficiency could be lowered to about 55%.

Existing compressors are designed with low volumetric efficiency at high speed to reduce system overcapacity as engine rpm increases. Most compressors are offered in 5-10 cubic inch displacements and are optimized for operation in the 1,000–3,000 rpm range. Because the size and cost of the brushless DC motor are directly related to its speed, the optimum design for automotive A/C calls for operating speeds of 8,000–10,000 rpm. This will require a small (1–2 cubic inch) displacement compressor to provide reasonable capacity at these operating speeds. The compressor would be direct-driven by the motor, eliminating the cost and weight of a clutch assembly.

The foregoing describes an electrically driven automotive air conditioner that can provide full cooling capacity at any speed and that can provide control of air conditioned air temperature without using reheating or compressor cycling. The electrically driven automotive air conditioner protects the electric motor driving the compressor from overload while maintaining driver comfort.

While the invention has been particularly shown and described with reference to preferred embodiments thereof, it will be understood by those skilled in the art that various changes in form and detail may be made without departing from the spirit and scope of the invention.

What is claimed is:

1. A method of controlling an electrically driven automotive air conditioning system, comprising the steps of:
    monitoring driver commanded air conditioner air delivery temperature, driver commanded proportion of outside to recirculated air to be introduced to the air conditioning system and driver commanded air conditioner blower fan speed;
    measuring actual air delivery temperature, motor power and motor temperature;
    varying the motor speed of the motor driving the air conditioner compressor to minimize difference between commanded and measured air delivery temperature;
    positioning a damper to achieve commanded proportion of outside to recirculated air;
    setting blower fan speed to commanded speed;
    overriding damper position and reducing the proportion of outside air, when motor power or temperature exceed predetermined limits, so that motor load is reduced;
    reducing motor speed when motor power or temperature exceed predetermined limits so that motor load is reduced;
    overriding commanded blower fan speed and reducing fan speed to reduce the load on the motor, when allowable motor temperature or power are exceeded; and
    restoring overridden damper position and fan speed, and allowing motor speed to vary to achieve commanded air temperature, when motor power and temperature no longer exceed allowable limits.

2. The method of claim 1 wherein said step of reducing the proportion of outside air continues until the minimum setting is reached, after the minimum setting is reached and the motor is still overloaded, then motor speed is reduced to reduce motor power and temperature below predetermined limits.

3. The method of claim 2 wherein said step of reducing motor speed continues until a minimum speed is reached, after the minimum speed is reached and the motor is still overloaded, then blower fan speed is reduced to reduce motor power and temperature below predetermined limits.

4. A method of controlling an electrically driven automotive air conditioning system, comprising the steps of:
    monitoring driver commanded cabin temperature and driver commanded proportion of outside air to recirculated air;
    measuring cabin air temperature, motor power and motor temperature;
    varying motor speed to minimize difference between commanded and measured temperature;
    positioning a damper to achieve commanded proportion of outside to recirculated air;
    determining blower fan speed responsive to the present value of motor speed, with blower fan speed increasing with increasing motor speed;
    setting blower fan speed to the determined value;
    overriding damper position and reducing the proportion of outside air, when motor power or temperature exceed predetermined limits, so that motor load is reduced;
    reducing motor speed when motor power or temperature exceed predetermined limits, so that motor load is reduced; and
    restoring overridden damper position and allowing motor speed to vary to achieve commanded cabin temperature when motor power and motor temperature no longer exceed allowable limits.

5. The method of claim 4 wherein said step of reducing the proportion of outside air continues until the minimum setting is reached, after the minimum setting is reached then motor speed is reduced to reduce motor power and temperature below predetermined limits.

6. The method of claim 4 wherein said step of determining blower fan speed comprises determining blower fan speed responsive to the present value of motor speed and damper position, with blower fan speed increasing with increasing motor speed and decreasing with damper positions increasing outside air flow.

7. Electrically driven automotive air conditioner system comprising:
    a damper for controlling the proportion of outside air to recirculated air introduced to the air conditioning system;
    a blower fan for controlling the rate at which air conditioned air is delivered;
    a compressor;
    a brushless DC motor hermetically sealed with and directly coupled to said compressor;
    means for monitoring driver commanded air conditioner air delivery temperature, driver commanded proportion of outside to recirculated air introduced into the air conditioning system and driver commanded air conditioner blower fan speed;
    means for measuring actual air delivery temperature, motor power and motor temperature;
    means for varying brushless DC motor speed to minimize the difference between commanded and measured air delivery temperature;
    means for positioning a damper to achieve commanded proportion of outside to recirculated air;
    means for setting blower fan speed to commanded speed;
    means for overriding damper position and reducing the proportion of outside air when motor power or temperature exceed predetermined limits, so that motor load is reduced;

means for reducing motor speed when motor power or temperature exceed predetermined limits, so that motor load is reduced;

means for overriding commanded blower fan speed to reduce fan speed to reduce the load on the motor when allowable motor temperature or power are exceeded; and means for restoring overridden damper position and fan speed and allowing motor speed to vary to achieve commanded air temperature when motor power and temperature no longer exceed predetermined limits.

8. Electrically driven automotive air conditioner system comprising:

a damper for controlling the proportion of outside air to recirculated air introduced to the air conditioning system;

a blower fan for controlling the rate at which air conditioned air is delivered;

a compressor;

a brushless DC motor hermetically sealed with and directly coupled to said compressor;

means for monitoring driver commanded cabin temperature and driver commanded proportion of outside air to recirculated air;

means for measuring cabin air temperature, motor power and motor temperature;

means for varying motor speed to minimize difference between commanded and measured temperature;

means for positioning the damper to achieve commanded proportion of outside to recirculated air;

means for determining blower fan speed responsive to the present value of motor speed, with blower fan speed increasing with increasing motor speed;

means for setting blower fan speed to the determined value;

means for overriding damper position, reducing the proportion of outside air when motor power or temperature exceed predetermined limits, so that motor load is reduced;

means for reducing motor speed when motor power or temperature exceed predetermined limits, so that motor load is reduced; and means for restoring overridden damper position and allowing DC motor speed to vary to achieve commanded cabin temperature when motor power and motor temperature no longer exceed predetermined limits.

9. The apparatus of claim 8 wherein said means for determining blower fan speed comprises means for determining blower fan speed responsive to the present value of motor speed and damper position, with blower fan speed increasing with increasing motor speed and decreasing with damper positions increasing outside air flow.

* * * * *